United States Patent [19]
Brenner

[11] Patent Number: 4,789,144
[45] Date of Patent: Dec. 6, 1988

[54] HYDRAULICALLY DAMPED MOTOR MOUNTS OR BEARINGS AND ELASTIC BEARINGS

[75] Inventor: Heinrich Brenner, Ahrweiler, Fed. Rep. of Germany

[73] Assignee: Boge AG, Eitorf, Fed. Rep. of Germany

[21] Appl. No.: 36,306

[22] Filed: Apr. 9, 1987

[30] Foreign Application Priority Data

Apr. 12, 1986 [DE] Fed. Rep. of Germany ....... 3612436

[51] Int. Cl.$^4$ .................. F16F 13/00; F16F 15/04
[52] U.S. Cl. ................... 267/140.1; 248/562; 267/35; 267/219
[58] Field of Search .............. 267/140.1, 140.4, 141, 267/141.2–141.7, 35, 122, 123, 152, 153, 201, 205, 219; 180/312, 291; 248/562, 563, 564, 566, 636, 637, 638

[56] References Cited

U.S. PATENT DOCUMENTS

| 4,378,936 | 4/1983 | Brenner | 267/219 X |
| 4,383,679 | 5/1983 | Kakimoto | 248/562 X |
| 4,572,490 | 2/1986 | Alciati | 267/35 |
| 4,660,813 | 4/1987 | Reuter | 267/140.1 |

FOREIGN PATENT DOCUMENTS

| 0042910 | 6/1982 | European Pat. Off. ........... 248/562 |
| 0174184 | 12/1986 | European Pat. Off. . |
| 1942853 | 3/1970 | Fed. Rep. of Germany . |
| 3050710 | 2/1982 | Fed. Rep. of Germany . |
| 2841505 | 4/1983 | Fed. Rep. of Germany . |
| 3225701 | 1/1984 | Fed. Rep. of Germany . |

Primary Examiner—Andres Kashnikow
Assistant Examiner—Matthew C. Graham
Attorney, Agent, or Firm—Nils H. Ljungman

[57] ABSTRACT

Hydraulically damping motor bearing, elastic bearing, etc., with at least two chambers containing damping fluid and located axially one behind the other, at least one of which exhibits a wall designed as an elastic spring element, whereby the chambers are separated from one another by a partition and are connected with one another by means of a passage. To achieve a passage which is of simple design and easy to construct, the wall of the passage is formed partly by an elastic portion and partly by a rigid portion of the partition, and both the rigid portion and the elastic portion have a discharge opening emptying into a chamber.

20 Claims, 4 Drawing Sheets

Fig. 3
Fig. 4
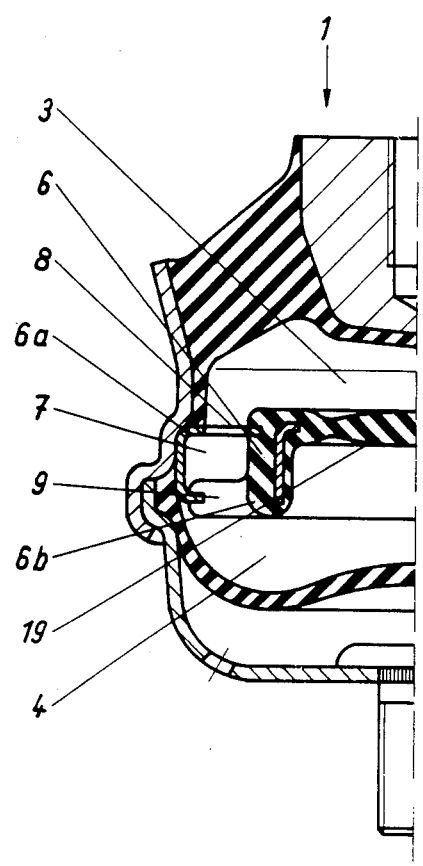
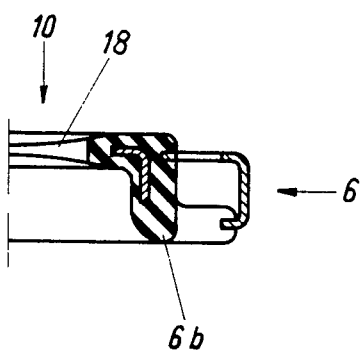

HYDRAULICALLY DAMPED MOTOR MOUNTS OR BEARINGS AND ELASTIC BEARINGS

CROSS-REFERENCE TO CO-PENDING APPLICATIONS

Co-pending application Ser. No. 868,116 filed on May 27, 1986, entitled "Axially-Loadable Bearing", which corresponds to Federal Republic of Germany Patent Application No. P 35 19 016.7-12, filed on May 25, 1985, which is assigned to the same assignee as the instant application, is incorporated herein by reference as if the text thereof was fully set forth herein.

BACKGROUND OF THE INVENTION

1. Field of the Invention

The invention relates to a hydraulically damping motor bearing, elastic bearing or similar item with at least two chambers containing damping fluid and located axially one behind the other, at least one of which exhibits a wall designed as an elastic spring element, whereby the chambers are connected to one another by means of a passage running in an essentially radial plane in a partition exhibiting a rigid portion and an elastic portion, whereby the two discharge openings are located each on one side of the partition.

2. Description of the Prior Art

Such bearings are used as mountings for drive units, transmissions or vehicle suspensions in all types of vehicles. For the mounting of such units in motor vehicles, one of the major imperatives for the elimination of noise transmission is the softest possible suspension with a low self-damping, but with damping characteristics which become very large to extinguish the movements of the units excited by the roadway.

The prior art includes elastic bearings of this type, for example, German Laid Open Patent Application No. DE-OS 32 25 701 and German Laid Open Patent Application No. DE-OS 30 50 710, in which working chambers filled with hydraulic fluid are connected to one another by a throttle opening with an equalization chamber filled with a variable amount of fluid, or another working chamber. The throttle passages used for this purpose can be designed and manufactured only with considerable effort and expense. The passages are either located directly in the rubber or else in the rigid portion, which must, therefore, be manufactured in two separate pieces and then assembled in a fluid-tight manner into a single piece. Each of the above-mentioned patents are incorporated by reference as if the entire contents thereof were fully set forth herein.

OBJECTS OF THE INVENTION

The object of the invention is to create a bearing which, while retaining the property of a good damping of low-frequency vibrations, has a long passage and a decoupling of high-frequency vibrations produced by the elasticity of the partition.

It is another object of the invention to produce a structurally simple design.

It is yet another object of the invention to produce a design which is simple to manufacture.

It is still another object of the invention to produce a bearing which can be installed economically.

SUMMARY OF THE INVENTION

The invention achieves these objects in that the wall of the passage is formed partly by the elastic portion and partly by the rigid portion of the partition, and that there is a discharge opening in both the elastic portion and in the rigid portion.

An advantage of this configuration is that the partition comprises an inner, membrane-like portion and an outer, rigid reinforcement portion. The passage or the passage walls are thereby formed by the elastic portion and by the rigid portion itself, whereby a discharge opening in the elastic portion empties into one chamber and another discharge opening in the rigid portion empties into the opposite chamber. This makes possible a simple bearing construction as well as economical manufacture, whereby a central, continuous fastening and an additional decoupling by simple means also becomes possible.

According to another preferred feature, the passage is located in the vicinity of the outside circumference of the partition. This achieves a good damping of vibrations by means of a relatively long passage.

In one embodiment of the invention, the rigid portion and the elastic portion of the partition are interlocked, firmly but detachably. To fasten the two parts together, the rigid part designed as the reinforcement part is interlocked with the elastic part. Therefore, no expensive fabrication methods are necessary to achieve a firm connection and a fluid-tight seal.

One favorable embodiment provides that the elastic portion is supported by the rigid portion and is clamped rigidly and tightly by the latter on the circumference. The rigid portion is thereby integrated by the shaping of the external housing so that both an interlock and a force-fit are achieved by the metal outer part forming the housing.

To decouple high-frequency vibrations by the elasticity of the partition, the elastic portion of one embodiment of the invention is designed as a bellows. In another embodiment, defined axial excursions in the elastic portion can be executed by the central portion of the partition.

To reduce pressure peaks or cavitation in one of the chambers, another essential feature of the invention is that there is a bypass in the elastic portion.

A preferred embodiment of the invention resides broadly in a hydraulically damped bearing assembly having at least two chambers for containing hydraulic damping fluid separated by a wall. The hydraulically damped bearing comprises a first portion for connection to a first element external to the bearing, a second portion for connection to a second element external to the bearing, at least one of the first element and the second element for being damped by the bearing during use. An elastomeric arrangement connects the first portion and the second portion to form at least one wall portion of a first of at least two chambers. A partition separates two of at least two chambers and forms a second wall of the first of the chambers. The partition comprises an elastic portion having an orifice therein for permitting passage of hydraulic damping fluid from one of the two chambers to the other and a rigid portion having an orifice therein for permitting passage of hydraulic damping fluid from one of the two chambers to the other. The orifice in the elastic portion is hydraulically connected in series with the orifice in the rigid portion whereby a substantial portion of damping fluid flowing through one of the orifices in use also flows through the other orifice.

Another embodiment of the invention resides broadly in a hydraulically damped bearing assembly having at least two chambers for containing hydraulic damping fluid separated by a wall and wherein the partition has an outer periphery and wherein the orifices are disposed at the outer periphery.

A yet another embodiment of the invention resides broadly in a hydraulically damped bearing assembly having at least two chambers for containing hydraulic damping fluid separated by a wall and wherein the rigid portion and the elastic portion have an apparatus for firmly interlocking with one another.

A yet further embodiment of the invention resides broadly in a hydraulically damped bearing assembly having at least two chambers for containing hydraulic damping fluid separated by a wall and wherein the interlocking apparatus has an arrangement for detaching the elastic portion from the rigid portion.

Another yet further embodiment of the invention resides broadly in a hydraulically damped bearing assembly having at least two chambers for containing hydraulic damping fluid separated by a wall and wherein the rigid portion encircles an outer periphery of the elastic portion and wherein the rigid portion suspends the elastic portion firmly and tightly.

A still further embodiment of the invention resides broadly in a hydraulically damped bearing assembly having at least two chambers for containing hydraulic damping fluid separated by a wall and wherein the elastic portion comprises a curved arrangement.

Yet another embodiment of the invention resides broadly in a hydraulically damped bearing assembly having at least two chambers for containing hydraulic damping fluid separated by a wall and wherein the curved arrangement comprises a bellows apparatus.

Another yet further embodiment of the invention resides broadly in a hydraulically damped bearing assembly having at least two chambers for containing hydraulic damping fluid separated by a wall and wherein the elastic portion comprises a central, substantially inelastic, part which is movable within the elastic portion.

Again yet another embodiment of the invention resides broadly in a hydraulically damped bearing assembly having at least two chambers for containing hydraulic damping fluid separated by a wall including a bypass arrangement disposed in the elastic portion.

A still further embodiment of the invention resides broadly in a hydraulically damped bearing assembly having at least two chambers for containing hydraulic damping fluid separated by a wall and wherein the bypass arrangement is disposed in a central, substantially inelastic, part of the elastic portion which is movable within the elastic portion.

BRIEF DESCRIPTION OF THE DRAWINGS

Preferred embodiments of the invention are illustrated schematically in the drawings.

FIG. 3 shows, in cross section, another embodiment of a motor bearing with a central area of the elastic portion designed as a decoupling spring.

FIG. 4 shows, in cross section, the motor bearing illustrated in FIG. 3, in which there is a bypass in the elastic portion of the partition.

DESCRIPTION OF THE PREFERRED EMBODIMENTS

Figure 1:
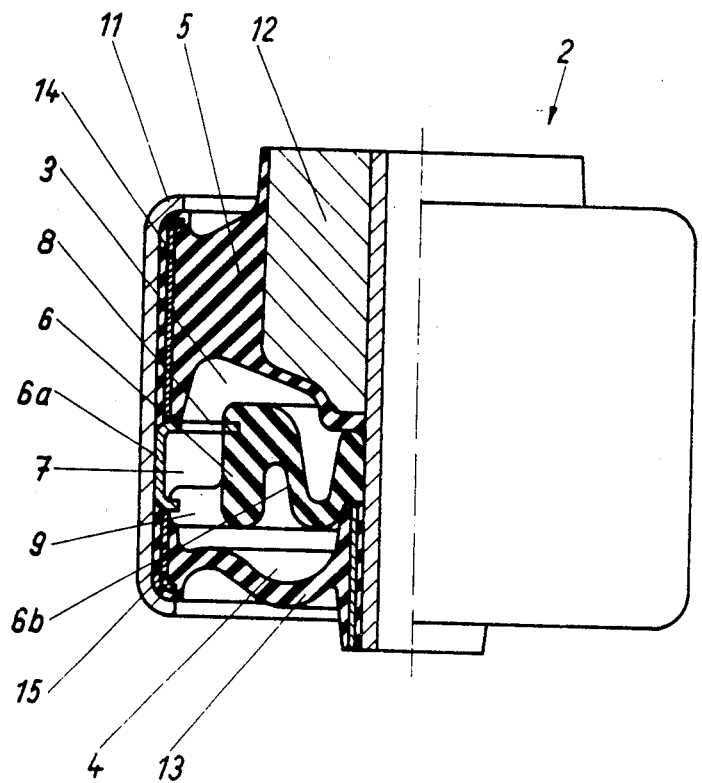
FIG. 1 shows, in cross section, an elastic bearing located in a metal housing, with a central, continuous fastening.

An elastic bearing 2 shown in FIG. 1 comprises essentially an external housing 11 and a central fastening portion 12. Between a housing 11 and the fastening part 12, there is a spring element 5 which, together with bellows 13, forms an inner chamber, which is divided by a partition 6 into a chamber 3 and a chamber 4. The chamber 3 thereby serves as a working chamber and the chamber 4 as the equalization chamber.

The partition 6 comprises in detail the rigid portion 6a and the elastic portion 6b. Both parts 6a and 6b thereby form the passage 7. As a result of the essentially L-shaped configuration of the rigid portion 6a and the peripheral region of the elastic portion 6b, which is also essentially L-shaped, a rectangular passage 7 is formed. In the rigid portion 6a there is a discharge opening 8, and in the elastic portion there is a discharge opening 9, which connects the chambers 3 and 4 with one another. These discharge openings 8 and 9 are offset from one another on the circumference. The passage 7 runs in the outside portion of the chambers so that, as a result of the offsetting of the discharge openings 8 and 9, a length is achieved which is appropriate for the proper damping of low-frequency vibrations. The elastic portion 6b is fastened to the rigid portion 6a by interlocking, whereby again the rigid portion 6a is held between two sleeves 14 and 15 in the housing 11 so that it cannot move axially. In this embodiment, the partition 6, and more particularly the elastic portion 6b, are designed as a bellows so that the elastic portion 6b can execute defined axial excursions for the decoupling of high-frequency vibrations.

Figure 2:
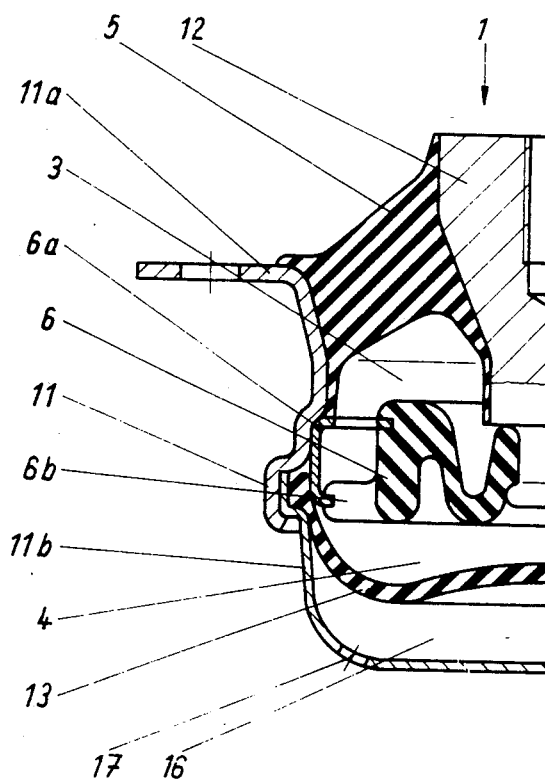
FIG. 2 shows, in cross section, a motor bearing with an elastic portion of the partition designed as a bellows.

FIG. 2 shows a motor bearing 1 whose housing 11 comprises the parts 11a and 11b. Between the fastening portion 12 and the housing 11a there is a spring element 5 which, together with the partition 6 and bellows 13, forms the chambers 3 and 4. The partition 6 comprises again the rigid portion 6a and the elastic portion 6b, essentially as already illustrated in FIG. 1, whereby the axial fixation of the rigid portion 6a in the vicinity of the separation point of the housing parts 11a and 11b is held immovably in the axial direction by interlocking or force-fitting. For an unpressurized intake of damping fluid in the chamber 4, bellows 13 are located in a chamber 16, which is open to the outside by means of a hole 17.

FIG. 3 shows another embodiment of a motor bearing 1 in which the partition 6 again is formed by the rigid portion 6a and the elastic portion 6b. The passage 7 has a discharge opening 8 to the chamber 3 and another discharge opening 9 to the chamber 4. The discharge opening 8 is thereby disposed in the rigid portion 6a, and the discharge opening 9 is disposed in the elastic portion 6b of the partition 6. The elastic portion 6b has a membrane-like wall 19 in its center which, by means of an appropriate structural configuration, can execute defined axial excursions to decouple high-frequency vibrations.

FIG. 4 shows the vicinity of the partition 6 of the motor bearing illustrated in FIG. 3 with the distinction that, in the elastic portion 6b, in its central region, there is a bypass 10 to compensate for pressure peaks or any cavitation which may occur. The bypass 10 can comprise a cross-shaped slit 18, for example.

Figure 5:
FIG. 5, 6, 7, 8, 9, 10 and show individual embodiments of the elastic portion illustrated in FIG. 4.
Figure 6:
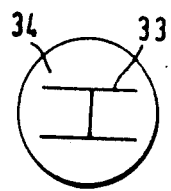
Figure 7:
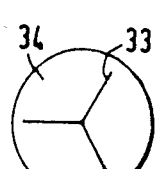
Figure 8:
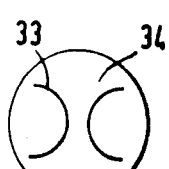
Figure 9:
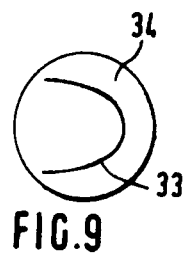

Individual embodiments of the elastic plate 34 (referred to as the elastic portion 6b in FIGS. 1-4 above) are illustrated in FIGS. 5-9. FIG. 5 shows a slot 33 (referred to as a slit 18 in FIGS. 1-4 above), which was produced in the form of a cross-shaped cut. The slot 33 in FIG. 6 has an H-shaped cut. In FIG. 7, the slot 33 comprises three cuts running in a star shape toward the center, and FIG. 8 shows two semicircular cuts and FIG. 9 one semicircular or arc-shaped cut. All these slots 33 shown in FIGS. 5 to 9 act as a valve 28 (referred to as the bypass 10 supra) common to both the compression and the decompression phase.

Figure 10:
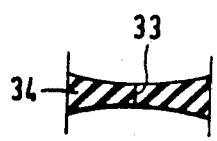

FIG. 10 shows an elastic plate 34, which in cross sections exhibits a concave shape on both surfaces. This hollow plate 34 assures a smooth transition when the pressure equalization begins, since the slot 33 opens slowly and smoothly.

Figure 11:
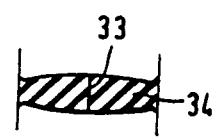

In contrast, FIG. 11 shows a spherical embodiment of the elastic plate 34. :en a pressure equalization takes place, the convex shape makes possible an all-at-once opening of the split 33.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically damped bearing assembly having at least two chambers for containing hydraulic damping fluid separated by a wall, said hydraulically damped bearing assembly comprising:
    a first portion for connection to a first element external to the bearing assembly;
    a second portion for connection to a second element external to the bearing assembly;
    said first and second portions each having an axis, the axes being substantially aligned one to the other,
    at least one of said first element and said second element for being damped by said bearing assembly during use;
    elastomeric means connecting said first portion and said second portion to form at least one wall portion of a first of said at least two chambers;
    a partition separating two of said at least two chambers and forming a wall of one of said chambers;
    said at least two chambers being disposed one after the other axially along said axes;
    said partition being disposed in a substantially radial plane, said plane being substantially perpendicular to said axes;
    said partition comprising:
    an elastic portion having a first orifice therein for permitting passage of hydraulic damping fluid from one of said two chambers to the other;
    a rigid portion having a second orifice therein for permitting passage of hydraulic damping fluid from one of said two chambers to the other;
    the first orifice being disposed on one side of the partition;
    the second orifice being disposed on the other side of the partition at one of said at least two chambers;
    said first orifice in said elastic portion being hydraulically connected in series with said second orifice in said rigid portion whereby a substantial portion of damping fluid flowing through one of said orifices in use also flows through the other orifice;
    said first and second orifices being disposed away from one another;
    a passage being disposed between said first and second orifices, said passage being disposed in a planar region, said planar region being substantially at right angles to at least one of said axes.

2. The hydraulically damped bearing assembly according to claim 1 wherein said partition has an outer periphery ad wherein said orifices are disposed immediately adjacent said outer periphery.

3. The hydraulically damped bearing assembly according to claim 2 wherein said elastic portion comprises curved means.

4. The hydraulically damped bearing assembly according to claim 2 wherein said rigid portion encircles an outer periphery of said elastic portion and wherein said rigid portion suspends said elastic portion firmly and tightly.

5. The hydraulically damped bearing assembly according to claim 4 wherein said curved means comprises bellows means.

6. The hydraulically damped bearing assembly according to claim 1 wherein said rigid portion and said elastic portion have means for firmly interlocking with one another.

7. The hydraulically damped bearing assembly according to claim 6 wherein said elastic portion comprises curved means.

8. The hydraulically damped bearing assembly according to claim 6 wherein said interlocking means has means for detaching said elastic portion from said rigid portion.

9. The hydraulically damped bearing assembly according to claim 8 wherein said elastic portion comprises curved means.

10. The hydraulically damped bearing assembly according to claim 1 wherein said rigid portion encircles an outer periphery of said elastic portion and wherein said rigid portion suspends said elastic portion firmly and tightly.

11. The hydraulically damped bearing assembly according to claim 10 wherein said elastic portion comprises curved means.

12. The hydraulically damped bearing assembly according to claim 11 wherein said curved means comprises bellows means.

13. The hydraulically damped bearing assembly according to claim 12 wherein said elastic portion comprises a central, substantially inelastic, part which is movable within the elastic portion.

14. The hydraulically damped bearing assembly according to claim 12 including bypass means disposed in the elastic portion.

15. The hydraulically damped bearing assembly according to claim 14 wherein said bypass means is disposed in a central, substantially inelastic, part of said elastic portion which is movable within the elastic portion.

16. The hydraulically damped bearing assembly according to claim 1 wherein said elastic portion comprises curved means.

17. The hydraulically damped bearing assembly according to claim 1 wherein said elastic portion comprises a central, substantially inelastic, part which is movable within the elastic portion.

18. The hydraulically damped bearing assembly according to claim 1 including bypass means disposed in the elastic portion.

19. The hydraulically damped bearing assembly according to claim 18 wherein said bypass means is disposed in a central, substantially inelastic, part of said elastic portion which is movable within the elastic portion.

20. The hydraulically damped bearing assembly according to claim 1 wherein said passage being disposed between said first and second orifices has a given length, said given length for providing damping of low frequency vibrations of said assembly in a given range of frequencies.

* * * * *